(12) United States Patent
Galbreath et al.

(10) Patent No.: US 8,282,164 B2
(45) Date of Patent: Oct. 9, 2012

(54) SEATING DURABILITY LAYER ELECTRICAL, MECHANICAL AND CONNECTING SYSTEM INTEGRATION

(75) Inventors: Ashford Allen Galbreath, Troy, MI (US); Asad S. Ali, Troy, MI (US)

(73) Assignee: Lear Corporation, Southfield, MI (US)

( * ) Notice: Subject to any disclaimer, the term of this patent is extended or adjusted under 35 U.S.C. 154(b) by 66 days.

(21) Appl. No.: 12/989,707

(22) PCT Filed: Aug. 1, 2008

(86) PCT No.: PCT/US2008/071904
§ 371 (c)(1),
(2), (4) Date: Oct. 26, 2010

(87) PCT Pub. No.: WO2010/014110
PCT Pub. Date: Feb. 4, 2010

(65) Prior Publication Data
US 2011/0109133 A1 May 12, 2011

(51) Int. Cl.
A47C 7/72 (2006.01)
A47C 7/18 (2006.01)

(52) U.S. Cl. ........... 297/217.3; 297/188.08; 297/188.09; 297/452.27; 297/452.48

(58) Field of Classification Search ............ 297/188.08, 297/188.09, 188.1, 188.11, 188.12, 188.13, 297/452.27, 217.3, 452.48
See application file for complete search history.

(56) References Cited

U.S. PATENT DOCUMENTS

| | | | |
|---|---|---|---|
| 3,736,022 A | 5/1973 | Radke | |
| 4,755,411 A | 7/1988 | Wing et al. | |
| 4,836,609 A | 6/1989 | Hill | |
| 4,852,228 A | 8/1989 | Zeilinger | |
| 4,865,379 A * | 9/1989 | Aoki et al. | 297/180.12 |
| 5,720,514 A * | 2/1998 | Carlsen et al. | 297/188.1 |
| 6,003,950 A | 12/1999 | Larsson | |
| 6,027,171 A | 2/2000 | Partington et al. | |
| 6,063,461 A | 5/2000 | Hoyle et al. | |
| 6,733,072 B2 * | 5/2004 | Jaillet et al. | 297/180.13 |
| 6,739,655 B1 | 5/2004 | Schwochert et al. | |
| 6,817,673 B2 | 11/2004 | Walker et al. | |
| 6,817,675 B2 | 11/2004 | Buss et al. | |
| 7,140,658 B2 * | 11/2006 | Maceri et al. | 297/188.09 X |
| 7,328,943 B2 * | 2/2008 | Johnson et al. | 297/188.1 |
| 7,862,097 B2 * | 1/2011 | Maceri et al. | 297/188.09 X |
| 2004/0084937 A1 | 5/2004 | Berta | |
| 2005/0110312 A1 | 5/2005 | Pinkos | |
| 2005/0150090 A1 | 7/2005 | Pedde et al. | |
| 2005/0212335 A1* | 9/2005 | Johnson et al. | 297/188.08 |
| 2007/0001489 A1 | 1/2007 | Terech | |
| 2007/0158994 A1 | 7/2007 | Brennan et al. | |
| 2007/0188007 A1 | 8/2007 | Lazanja et al. | |
| 2008/0018162 A1 | 1/2008 | Galbreath et al. | |
| 2008/0042482 A1 | 2/2008 | Weiss et al. | |
| 2009/0146472 A1* | 6/2009 | Galbreath et al. | 297/452.27 X |

* cited by examiner

Primary Examiner — Rodney B White
(74) Attorney, Agent, or Firm — Brooks Kushman P.C.

(57) ABSTRACT

A vehicle seat assembly has a seat bottom that is adapted for attachment to a vehicle. The seat bottom has a foam layer and an expanded polymer layer that defines a first cavity. The first cavity is configured to receive an electrical component.

20 Claims, 4 Drawing Sheets

SEATING DURABILITY LAYER ELECTRICAL, MECHANICAL AND CONNECTING SYSTEM INTEGRATION

BACKGROUND OF THE INVENTION

1. Field of the Invention

Embodiments of the present invention relate to the field of vehicle seat assemblies having an expanded polymer layer or member having cavities defined therein to receive electrical components. In some embodiments, electrical components may be molded directly into the expanded polymer layer. In other embodiments, some electrical components may be directly molded into the expanded polymer layer, while others may be inserted into the expanded polymer layer subsequent to molding. In some embodiments, the expanded polymer layer may be integral with other seat components. In other embodiments, the expanded polymer layer may be a separate component that is attached to the vehicle seat assembly.

2. Background Art

Vehicle seat assemblies have become laden with electronic components which are secured to the undercarriage of the seat assembly using a variety of mechanical fasteners including ties, clips and threaded fasteners. Each electronic component includes a wire assembly or cable to convey power and/or signals to and from the electric component. As the vehicle seat assembly's functionality increases, the competition for space under the vehicle seat assembly increases and the logistics of attaching the electric components and orderly aligning their associated wire assemblies and cables can be cumbersome. It would be advantageous if the attachment of such electric components and the arrangement of their wire assemblies and cables could be simplified to save time when attaching such components. It would also be advantageous to efficiently utilize the space underneath the vehicle seat assembly. The present invention addresses these and other concerns.

SUMMARY OF THE INVENTION

In accordance with a first aspect of the invention, a vehicle seat assembly is disclosed. In a first embodiment, the vehicle seat assembly includes a seat bottom that is adapted for attachment to a vehicle. The seat bottom has a foam layer. A first expanded polymer layer disposed adjacent the foam layer. The first expanded polymer layer defines a first cavity configured to receive an electrical component.

In at least one implementation of the first embodiment, the electrical component is a wire assembly. In other implementations, the electrical component may be a connector housing, a memory seat module, a PCB, a switch, under-seat lighting, motors, a wire harness, an FFC wire harness, and connectors.

In another implementation of the first embodiment, the electrical component is a motor assembly.

In another implementation of the first embodiment, the first cavity has a negative draft angle to retain the electrical component within the first cavity.

In another implementation of the first embodiment, the first expanded polymer layer comprises expanded polypropylene.

In another implementation of the first embodiment, a substantial portion of the electrical component is enveloped by the first expanded polymer layer and is bonded to an interior surface of the first cavity.

In another implementation of the first embodiment, the seat assembly further comprises a second expanded polymer layer disposed adjacent to the first expanded polymer layer. The second expanded polymer layer defines a second cavity that aligns with the first cavity to enclose the electrical component.

In another implementation of the first embodiment, the first expanded polymer layer is configured to receive the electrical component in a snap fit relationship. In other implementations, the electrical component can be molded directly into the first expanded polymer layer.

In another implementation of the first embodiment, the first cavity comprises an elongated channel having opposing walls. The elongate channel may be configured to receive and retain a first wire assembly between the opposing walls. In a variation of this implementation, a pair of spaced apart steps may be defined by the opposing walls. The steps may be spaced apart from one another by a distance that is less than a distance separating the opposing walls. The steps may be configured to receive and retain a second wire assembly between the steps. The second wire assembly may have a diameter that is narrower than a diameter of the first wire assembly.

In another variation of the preceding implementation, the first expanded polymer layer may include a first pair of tabs that are spaced apart from one another by a first distance. The first pair of tabs are disposed within the elongate channel and are configured to retain a second wire assembly having a second diameter within the elongate channel. In a further variation, the seat assembly may further comprise a second pair of tabs spaced apart from one another by a second distance. The second distance is less than the first distance. The second pair of tabs is disposed within the elongate channel and is configured to retain a third wire assembly within the elongate channel, the third wire assembly having a third diameter that is less than the second diameter.

In another implementation of the first embodiment, the seat assembly further comprises a clip that is partially molded into the first expanded polymer layer.

In another implementation of the first embodiment, the seat assembly further comprises a wire assembly including a wire and an insulating material. The wire assembly may be partially enveloped by the first expanded polymer layer such that a portion of the wire assembly is completely enveloped within the first expanded polymer layer and a portion of the wire assembly extends externally from the first expanded polymer layer. In a variation of this implementation, the portion of the wire assembly that is completely enveloped within the first expanded polymer layer has less insulating material than the portion of the wire assembly that extends externally from the first expanded polymer layer.

In another implementation of the first embodiment, the first expanded polymer layer comprises a first portion of polyolefin having a first density and a second portion of polyolefin having a second density. In other implementations, the first portion of polyolefin may have a first hardness and the second portion of polyolefin may have a second hardness.

In a second embodiment, the vehicle seat component comprises a seat bottom that is adapted for attachment to a vehicle and an expanded polymer member that is connected to the seat bottom. The expanded polymer member defines a cavity for receiving an electrical component.

In an implementation of the second embodiment, the cavity may be configured to retain the electrical component within the cavity through at least a partial interference fit.

In another implementation of the second embodiment, the expanded polymer member comprises expanded polypropylene.

In a second aspect of the invention, a method of manufacturing a vehicle seat assembly is disclosed. The method comprises providing a seat body having a seat bottom including an expanded polymer layer defining a cavity for receiving an electrical component, providing an electrical component and positioning the electrical component within the cavity.

BRIEF DESCRIPTION OF THE DRAWINGS

The description herein makes reference to the accompanying drawings wherein like reference numerals refer to like parts throughout the several views, and in which.

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Conventional vehicle seat assemblies typically include a seat cushion made of polyurethane supported on a metal seat cushion pan. This assembly is, in turn, supported by a metal frame and frequently includes rails to slidably mount the seat assembly to the floor of a motor vehicle. The seat cushion is typically enclosed in upholstery including leather, vinyl and cloth. In vehicle seat assemblies like the one just described, electrical components such as motors, wires and controllers are typically mounted to the metal support frame. Such components typically include substantial amounts of insulation as well as strict design tolerances on the motor gears and housing thicknesses and other insulating properties to reduce noise, vibration and harshness during component operations. Other components such as wire assemblies also include substantial amounts of insulation because of the exposed position in which they may be mounted. Such wire assemblies may require substantial insulation to withstand the fatigue associated with movement and also to guard against abrasion resulting from contact with other components or items. The insulation of such components as well as the necessity for strict design tolerances on the motor gears and elevated levels of thicknesses on housings could be downgraded if the material surrounding these components were vibration insulating. The mounting of such components can be a time consuming and labor intensive task. The mounting of such components in an exposed manner to the undercarriage of a seat can present an untidy appearance that presents the risk of snags and interference with objects placed beneath the vehicle seat assembly.

Vehicle seat assemblies have been developed that use an expanded polymer such as expanded polypropylene or other expanded polyolefins or expanded polystyrenes to replace the seat cushion pan and portions of the seat frame. In other embodiments, the expanded polymer is used as structural layer in a composite cushion having a structural layer and a cushion layer. Such a vehicle seat assembly is disclosed in pending U.S. patent application having the Ser. No. 11/458,832 which is hereby incorporated herein in its entirety.

The structural layer can be any suitable structural foam material. In at least one embodiment, suitable structural materials will have a rigidity and/or density that is higher than conventional polyurethane foam. In at least one embodiment, suitable structural foam materials have a density of at least 1.75 pounds per cubic foot (pcf), and less than 7.0 pcf. In at least another embodiment, suitable structural foam materials will have a density of 2.0 to 4.0 pcf, and in yet other embodiments of 2.5 to 3.5 pcf. Density of the structural foam material can be measured in accordance with ASTM test method No. D3574.

In at least one embodiment, suitable structural materials will have a hardness of 150 to 250 N (Newtons), in at least another embodiment of 175 to 230 N, and in at least another embodiment of 190 to 215 N. Hardness can be measured by ASTM test method No. D3574 and at 25% compression or deflection. In at least one embodiment, suitable structural materials will have a compression strength of 20 to 100 psi, in at least another embodiment of 30 to 80, and in at least another embodiment of 35 to 65, as measured in accordance with ASTM test method No. D3574.

In at least one embodiment, the structural layer comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, and the like. In another embodiment, the structural layer may comprise expanded polystyrene (EPS). In another embodiment, the structural layer may comprise a blend of EPP and EPS.

In at least one particular preferred embodiment, the EPO is expanded polypropylene (EPP) and its copolymers with ethylene, propylene and butylene. Any suitable EPP may be used, however in at least one embodiment, suitable EPP's include, but are not limited to, ARPRO® EPP available from JSP International and EPP available from SCA Packaging North America.

Expanded polyolefins can be prepared by a bead polymerization process in which relatively small uniform beads of polymer are produced, containing a gas which is later utilized to effect blowing during the molding process. The most commonly used gas is air although other gases including low boiling point liquids which produce gases at the molding temperatures may be used. Suitable gases include, but are not limited to air, nitrogen, carbon dioxide, pentene and the like.

While the structural layer can have any suitable size and configuration, in at least one embodiment, the structural layer has an average thickness of 5 to 100 mm, in other embodiments of 20 to 70 mm, and in yet other embodiments of 30 to 50 mm.

The cushion layer can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574. In at least one embodiment, suitable cushion materials will have a hardness of 175 N (Newtons) to 400 N, in other embodiments of 225 to 350 N, and in yet other embodiments of 275 to 325 N. Hardness of the cushion material can be measured by ASTM test method No. D3574. In at least one embodiment, suitable cushion materials will have a hysteresis of 18 to 30 KPa, in another embodiments of 20 to 28 KPa, and in yet other embodiments of 23-26 KPa. Hysteresis of the cushion material can be measured by ASTM test method No. D3574.

In at least certain embodiments, the cushion material comprises conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred. Soy-based polyurethane can be made with any suitable soy-based polyols, such as those available, but not necessarily limited to, from Bayer, Urethane Soy Systems, and Dow Chemical. Any suitable soy-based polyurethane may be used, however in at least one embodiment, suitable soy-based polyurethanes include, but are not necessarily limited to those available from Woodbridge Foam and Renosol. The cushion layer 26 can be any suitable size and shape, however, in at least one embodiment, the cushion layer 26 has an average thickness of 20 to 100 mm, and in at least another embodiment of 30 to 70 mm, and in still yet other embodiments of 40 to 60 mm.

In accordance with the teachings of the current invention, the expanded polymer layer may be formed to include cavities, channels and mounting devices such as clips, clamps and brackets to facilitate attachment of electrical components. Such an arrangement can reduce the labor associated with attaching electrical components to the vehicle seat assembly as well as providing prefabricated cavities to organize and arrange the placement of such electrical components. In some embodiments, electric components may be insert molded directly into the expanded polymer layer. For instance, a wire assembly may be positioned such that a portion of the wire assembly extends within the mold used to form the expanded polymer layer. The expanded polymer layer may be formed around the wire assembly with the result that the expanded polymer layer has a wire assembly integrated into the expanded polymer layer. A greater understanding of the invention may be gained through a review of the accompanying drawings together with the detailed description below.

Figure 1:
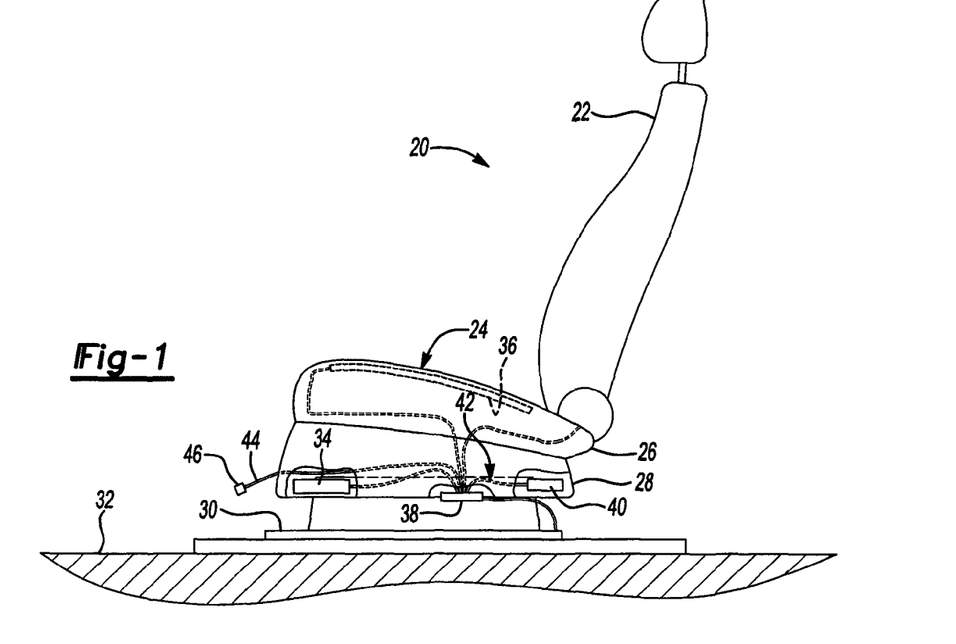
FIG. 1 is a schematic view illustrating a vehicle seat assembly made in accordance with the teachings of the present invention.

With respect to FIG. 1, a vehicle seat assembly 20 is schematically depicted. Vehicle seat assembly 20 may be adapted for connection to any type of motor vehicle including, but not limited to, sedans, coupes, convertibles, pickup trucks, sport utility vehicles, minivans, full size vans, crossover utility vehicles, and buses. In addition, vehicle seat assembly 20 may be used together with other vehicles including aircraft, water craft, spacecraft and other land based vehicles including rail driven vehicles.

Vehicle seat assembly 20 includes a seat back 22 and a seat bottom subassembly 24. The seat back 22 may be pivotally mounted to seat bottom subassembly 24. Seat bottom subassembly 24 includes a cushion or foam layer 26. Cushion layer 26 may be made of foam including, but not limited to, polyurethane, compressed coconut fiber, polymer fibers, non-woven polyester pads, and latex foams. Seat bottom subassembly 24 further includes a first expanded polymer layer 28. First expanded polymer layer 28 is supported on rails 30 which permit vehicle seat assembly 20 to be slidably mounted to floor surface 32. In the illustrated embodiment, first expanded polymer layer 28 is structural in nature, replacing a metal seat cushion pan that would typically support cushion layer 26. In some embodiments, first expanded polymer layer 28 may also replace portions of a seat frame that serves other structural purposes. First expanded polymer layer 28 may comprise any expanded polymer including expanded polyolefins and expanded polystyrenes. In one example, first expanded polymer layer 28 may comprise expanded polypropylene.

Incorporated within first expanded polymer layer 28 are three exemplary electrical components. The electrical components are disposed within cavities defined in a bottom surface of first expanded polymer layer 28. One exemplary electrical component may be switch 34 which may control a seat heating pad such as heating pad 36. Another exemplary electrical component is motor 38 which may control fore and aft motion of vehicle seat assembly 20 with respect to the floor surface 32. Another exemplary electrical component may include motor 40 which may control the pivotal motion of seat back 22 with respect to seat bottom subassembly 24. An additional exemplary electrical component illustrated in FIG. 1 is wire assembly 42. Portions of wire assembly 42 are completely enveloped within first expanded polymer layer 28 while other portions, for example, portion 44, extend externally from first expanded polymer layer 28. A portion of wire assembly 42 may include a connector 46 such as a plug or other type of connector which may engage an outlet or other connector configured to receive connector 46 and to deliver electrical power to wire assembly 42 through connector 46.

Figure 2:
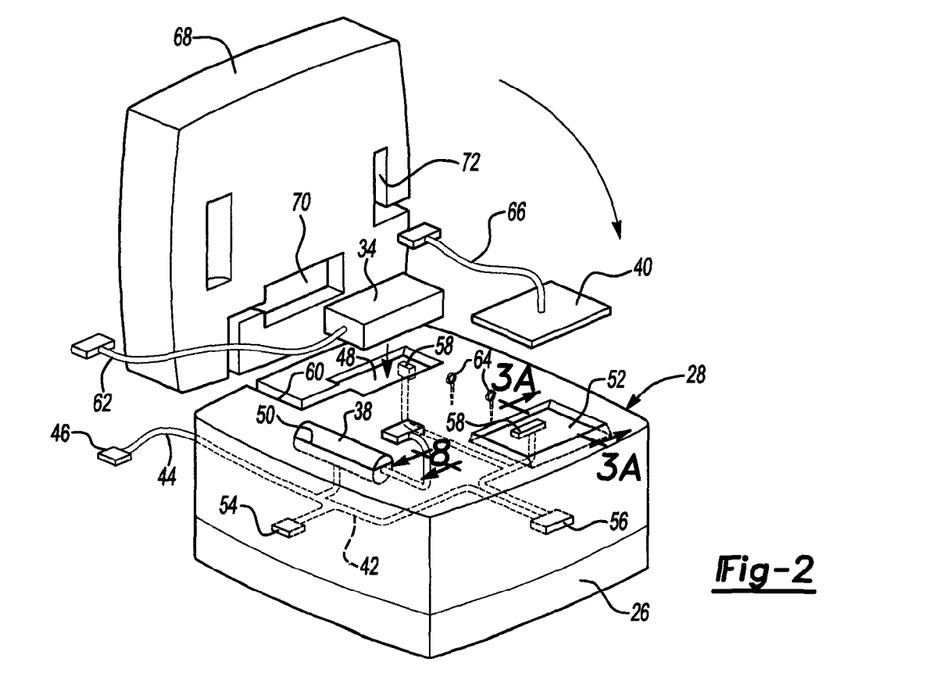
FIG. 2 is a perspective view illustrating an expanded polymer layer that is included with the vehicle seat assembly of FIG. 1.

With respect to FIG. 2, first expanded polymer layer 28 is illustrated in perspective view. Cushion layer 26 is illustrated below the first expanded polymer layer 28. It should be understood that in FIG. 2, what appears to be the top side of first expanded polymer layer 28 would actually be the bottom side when first expanded polymer layer 28 and cushion layer 26 are assembled to vehicle seat assembly 20.

As illustrated, first expanded polymer layer 28 includes three cavities, 48, 50 and 52 which correspond with switch 34, motor 38 and motor 40 respectively. Cavities 48, 50 and 52 may be formed in first expanded polymer layer 28 when first expanded polymer layer 28 is molded through the use of blocking members positioned within the mold that generally mimic the size and shape of electrical component to be positioned within the respective cavity. Alternatively, the cavities may be carved out of first expanded polymer layer 28 after first expanded polymer layer 28 is molded. In still other embodiments, the cavities may be formed by positioning the electrical component itself within the mold cavity when first expanded polymer layer 28 is molded.

Expanded polymer layer 28 may be molded such that the walls forming cavities 48, 50 and 52 have a negative draft angle. This will permit an electrical component to remain within the cavity without the need for additional fixtures or fasteners to restrain the electric component. In other embodiments, the cavity may be dimensioned such that when the respective electrical component is positioned within the cavity, there is an interference fit between the electrical component and the walls of the cavity. In still other embodiments, the walls of the cavity may define projections extending inwardly into the cavity to permit a snap fit. The nature of the expanded polymer used in first expanded polymer layer 28 is such that the material will flex sufficiently to permit the projections or the walls of the cavities themselves to move aside as the electrical component is pressed into position. This characteristic of the material also permits the molding of these cavities with walls having negative draft angles without causing die lock which would inhibit removal of the molded part from the mold.

Wire assembly 42 includes portions that are completely enveloped within first expanded polymer layer 28 (the enveloped portions are illustrated in phantom lines) and portion 44 of wire assembly 42 that extends externally from first expanded polymer layer 28. Wire assembly 42 may be positioned in the mold used to form first expanded polymer layer 28 and held in place by pins having clips or slots or by other devices to ensure that connectors attached to wire assembly 42 are properly positioned within first expanded polymer layer 28. In the illustrated embodiment, wire assembly 42 includes a plurality of connectors. Connector 46 is connected to portion 44 of wire assembly 42 that extends externally from first expanded polymer layer 28 while connectors 54 and 56 are embedded within first expanded polymer layer 28 such that only a tip of each connector is visible. Connectors 54 and 56 permit electric power to be routed through wire assembly 42. In some embodiments, the vehicle seat assembly 20 may have corresponding plugs positioned to align with connectors 54 and 56 when first expanded polymer layer 28 is assembled to vehicle seat assembly 20. In some instances, first expanded polymer layer 28 may be held in place through a connection with connectors 54 and 56. In other embodiments, portion 44 of wire assembly 42 and connector 46 may be required to extend for a distance and reach a plug, connector, or other power source that is not aligned with another connector.

Component connectors such as component connector 58 allow power to be routed from connectors such as connector 46, 54 and 56 to the electrical component. Component connectors 58 may be positioned such that only a small portion of the connector is visible from within cavities 48, 50 and 52 and may align with plugs or other connectors disposed on switch 34, motor 38 and motor 40. In this way, electrical power can be routed to the electrical components.

Channel 60 is defined in a surface of first expanded polymer layer 28 to route a wire assembly such as wire assembly 62 extending from switch 34 and to provide a pathway out of first expanded polymer layer 28 so that wire assembly 62 may be connected to another electrical component mounted externally of first expanded polymer layer 28 (not shown). Alternatively, clips 64 may be insert molded into first expanded polymer layer 28 to receive and guide wire assembly 66 leading from motor 40. Clips 64 can prevent wire assembly 66 from hanging downwardly when motor 40 is assembled to first expanded polymer layer 28.

In some embodiments, first expanded polymer layer 28 may have differing densities at various locations. For instance, it may be desirable to have greater densities in areas supporting/retaining the electrical components within a cavity to ensure that electrical components mounted therein will remain seated in the cavity. In such applications, the higher density expanded polymer may be less prone to flex in response to typical forces experienced by vehicle seat assembly 20 during vehicle operations. In other embodiments, it may be desirable for the portions of first expanded polymer layer 28 that define the cavities to be molded from an expanded polymer having a lower density than portions of the expanded polymer that are load bearing. This may facilitate the assembly of electrical components to the first expanded polymer layer 28 by, in some cases, reducing the effort required to insert the electrical components into the cavity.

In some embodiments, a second expanded polymer layer 68 may be removably connected to first expanded polymer layer 28. Second expanded polymer layer 68 may hold electrical components such as switch 34, and motors 38 and 40 in their respective cavities. Additionally, second expanded polymer layer 68 may provide additional insulation for the electrical components which may reduce abrasions and contact with other items which may be placed/stored under vehicle seat assembly 20 during vehicle operations. Second expanded polymer layer 68 may help reduce noise, vibration, and harshness that is associated with the operation of the electrical components and may permit the use of less expensive electrical components that have less shock protection and less insulation than corresponding components used in conventional vehicle seat assemblies where such components are exposed. The use of second expanded polymer layer 68 may provide the insulative benefits that would result from insert molding the electrical components and enveloping them within a single expanded polymer layer, but provides access to the electrical components in the event that they need maintenance, repair, or replacement.

Second expanded polymer layer 68 may include cavities such as cavity 70 to receive a portion of switch 34 and wire assembly 62 which projects beyond the upper surface of first expanded polymer layer 28 when seated within cavity 48. Cavity 72 is disposed to accommodate wire assembly 66 and clips 64 when motor 40 is disposed within cavity 52. In other embodiments, second expanded polymer layer 68 may not include a cavity, but rather a surface of second expanded polymer layer 68 may press the electrical components into their respective cavities within first expanded polymer layers 28 in an interference fit when second expanded polymer layer 68 is attached to first expanded polymer layer 28. Second expanded polymer layer 68 may be made from the same material as first expanded polymer layer 28 or from different materials having different properties.

Figure 3A:
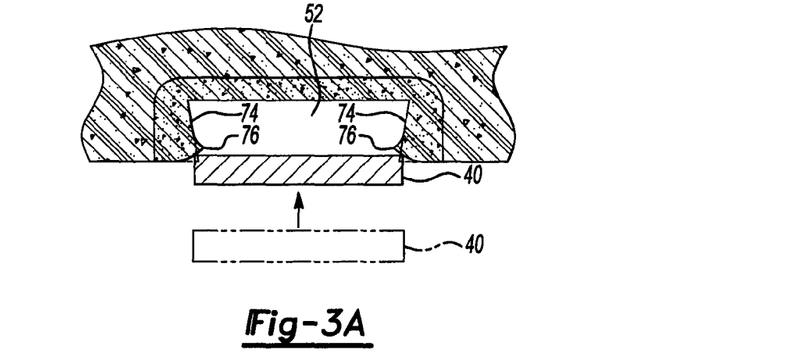
FIGS. 3A and 3B are cross-sectional views illustrating the installation of an electrical component into a cavity defined in the expanded polymer layer of FIG. 2.
Figure 3B:
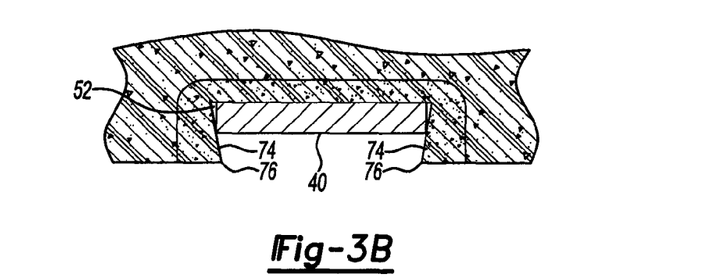

With respect to FIGS. 3A and 3B, one possible method for attaching an electrical component is illustrated. FIGS. 3A and 3B illustrate a cross section of cavity 52 taken along the line 3A-3A of FIG. 2. In FIG. 3A, the negative draft angle of cavity walls 74 can be clearly seen. Motor 40 is illustrated in phantom lines at an initial position aligned with cavity 52. Motor 40 is then moved towards cavity 52. Motor 40 is wider than the opening to cavity 52 and accordingly the ends of motor 40 engage corners 76 which deform downwardly as pressure is applied on motor 40 to press it into cavity 52. In FIG. 3A, corners 76 are depicted in their initial condition in phantom lines and are depicted in solid lines in their deformed state as motor 40 passes into cavity 52. With respect to FIG. 3B, motor 40 is seated within cavity 52 and held in place by a press fit or an interference fit between cavity walls 74 and motor 40. Corners 76 have returned to their initial shape.

Figure 4:
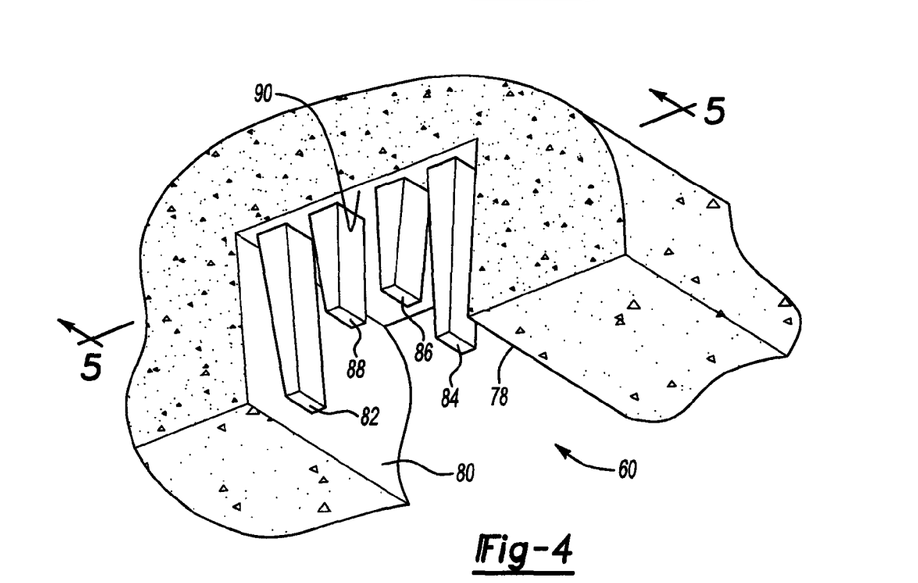
FIG. 4 is a fragmented perspective view illustrating a channel defined in the expanded polymer layer of FIG. 2.

With respect to FIG. 4, a fragmented perspective view is presented of a portion of channel 60. Channel 60 is formed to receive a wire assembly to transmit electric power throughout first expanded polymer layer 28. The walls 78, 80 are spaced apart by a distance corresponding to a wire assembly having a predetermined gage. So long as a wire assembly of that predetermined gage is placed within channel 60, walls 78 and 80 will be capable of securing that wire assembly within channel 60. Walls 78 and 80, however, may be spaced apart by too great a distance to secure a wire assembly within channel 60 if that wire assembly has a narrower gage within channel 60. To accommodate a narrower gage wire assembly, first pair of tabs 82, 84 are defined within channel 60. Tabs 82, 84 may be formed by cavities in the mold used to form first expanded polymer layer 28. First pair of tabs 82, 84 are spaced apart from one another by a distance that corresponds to a wire assembly having a different gage than that which could be secured by walls 78 and 80. If it is desirable to secure within channel 60 a wire assembly having a gage that corresponds to the distance between walls 78 and 80, an assembler need only break off first pair of tabs 82, 84 and remove them to make room for the wire assembly.

A second pair of tabs 86, 88 is also defined in channel 60. The distance between second pair of tabs 86, 88 is less than the distance between first pair of tabs 82, 84. Second pair of tabs 86, 88 permits an assembler to secure a wire assembly having a third gage, one that corresponds to the distance between tabs 86, 88 within channel 60. As with first pair of tabs 82, 84, second pair of tabs 86, 88 may also be broken out of channel 60 if it is desirable to secure within channel 60 a wire assembly having a gage that corresponds to the distance between walls 78 and 80 or a wire assembly having a gage that corresponds with first pair of tabs 82, 84. In some embodiments, walls 78 and 80 may be formed to have a negative draft angle to securely retain a wire assembly within channel 60. Similarly, first pair of tabs 82, 84 and second pair of tabs 86, 88 may also be formed to have a negative draft angle to retain correspondingly dimensioned wire assemblies. In still other embodiments, first pair of tabs 82, 84 and second pair of tabs 86, 88 may extend from walls 78, 80 rather than from floor 90 of channel 60.

Figure 5:
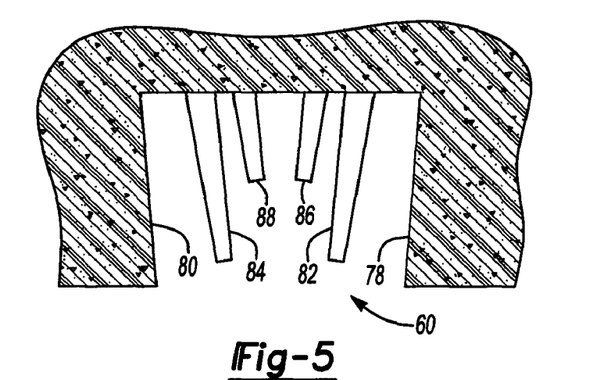
FIG. 5 is a cross-sectional view taken along the line 5-5 of FIG. 4.

With respect to FIG. 5, a cross-sectional view is illustrated taken along the lines 5-5 from FIG. 4. In this view, the differing distances between first pair of tabs 82 and 84 and between second pair of tabs 86, 88 are illustrated. In other embodiments, a greater or lesser number of pairs of tabs may be defined in channel 60 as desired.

Figure 6:
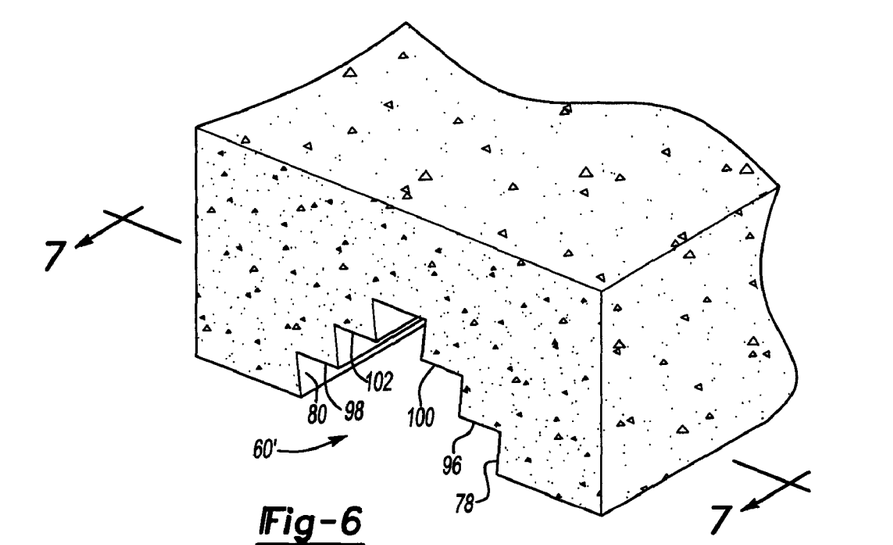
FIG. 6 is a fragmented perspective view illustrating an alternate embodiment of the channel of FIG. 4.

With respect to FIG. 6, an alternate embodiment, channel 60' is illustrated. Rather than positioning a plurality of pairs of tabs within the channel to accommodate differently dimensioned wire assemblies, the embodiment of channel 60' illustrated in FIG. 6 includes a plurality of steps defined within walls 78 and 80. A first pair of steps 96, 98 project inwardly from walls 78, 80 respectively and are separated by a distance that corresponds to a wire assembly having smaller diameter than a wire assembly that would be secured between walls 78 and 80. Similarly, second pair of steps 100, 102 project inwardly from first pair of steps 96, 98 and are separated by a distance narrower than the distance between first pair of steps 96, 98 and can secure a wire assembly having a diameter that corresponds to the distance between second pair of steps 100, 102. In some embodiments, channel 60' may extend more deeply into first expanded polymer layer 28 than does channel 60 described and illustrated in FIGS. 4 and 5. It may be desirable to use the configuration illustrated in FIGS. 4 and 5 when first expanded polymer layer 28 is relatively narrow whereas it may be desirable to use the configuration illustrated in FIGS. 6 and 7 in applications where first expanded polymer layer 28 is relatively thick.

Figure 7:
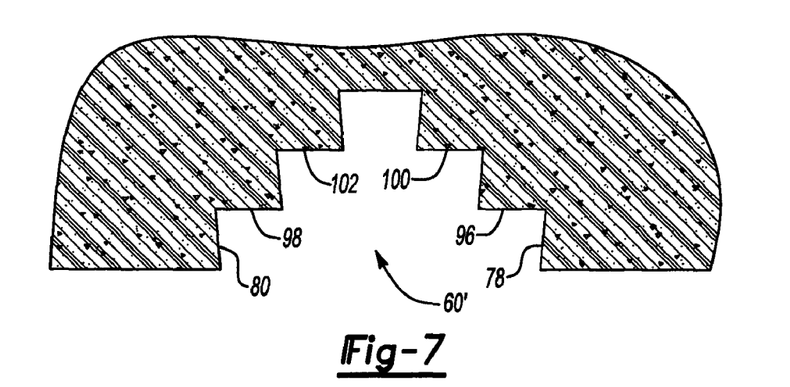
FIG. 7 is a cross-section taken along the line 7-7 of FIG. 6.

FIG. 7 illustrates a cross-section taken across the lines 7-7 of FIG. 6. It illustrates the differing distances between opposing walls 78 and 80, steps 96 and 98, and steps 100 and 102. As best illustrated in FIG. 7, walls 78 and 80 and first pair of steps 96 and 98 and second pair of steps 100 and 102 can be formed to have a negative draft angle for the purposes of securing a wire assembly within channel 60'.

Figure 8:
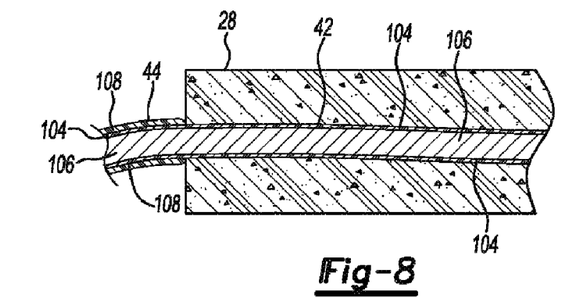
FIG. 8 is a cross-sectional view taken along the line 8-8 of FIG. 2.

With respect to FIG. 8, a fragmentary cross-sectional view is taken along the line 8-8 of FIG. 2 illustrating wire assembly 42 as it passes through, and extends outwardly from, first expanded polymer layer 28. Portion 44 of wire assembly 42 is also illustrated. Wire assembly 42 includes a single layer of insulation 104 to insulate wire 106 as it passes through first expanded polymer layer 28. In some embodiments, the portion of wire assembly 42 passing through first expanded polymer layer 28 may need insulation. Once wire 106 extends outwardly from first expanded polymer layer 28, a second layer of insulation 108 is provided to give wire 106 an added measure of protection against abrasion as well as providing additional electrical insulation. In other embodiments, and depending upon the application, additional layers of insulation may be provided around wire 106 as needed.

Figure 9:
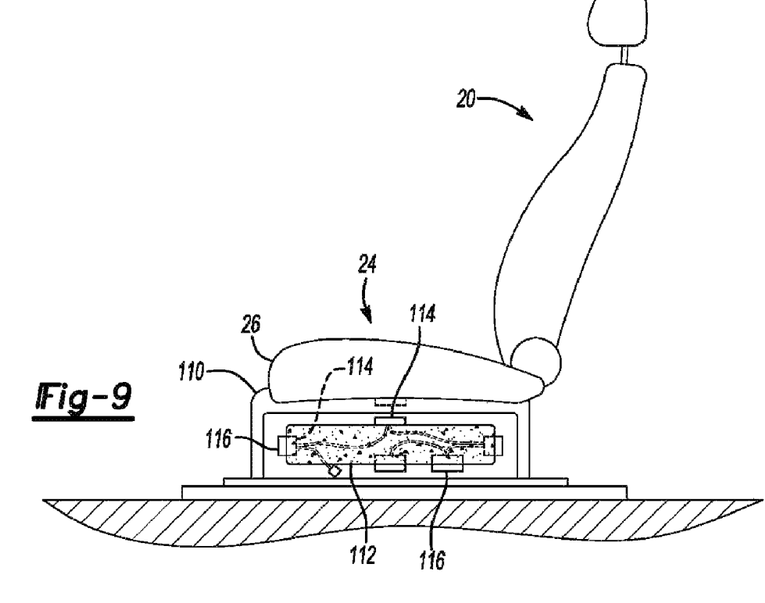
FIG. 9 is a schematic view illustrating an alternate embodiment of the vehicle seat assembly of FIG. 1.

With respect to FIG. 9, an alternate embodiment of vehicle seat assembly 20 is illustrated. In the embodiment illustrated in FIG. 9, vehicle seat assembly 20 includes a seat bottom subassembly 24 having a cushion layer 26 and a seat frame 110. Seat frame 110 may be made of any suitable metal including, but not limited to, steel, aluminum, magnesium, and structural material composite (for example, fiberglass and carbon fiber). Expanded polymer member 112 is provided as a separate component and is secured to seat frame 110. Expanded polymer member 112 may be configured to fit beneath seat frame 110 and may be configured to provide the same functionality described above with respect to first expanded polymer layer 28. In some embodiments, a connector 114 may be disposed on a surface of first expanded polymer member 112 and configured and positioned to engage and align with a seat frame mounted connector 116. In such embodiments, expanded polymer member 112 may be "plugged in" to vehicle seat assembly 20 and all the components contained therein may receive power and transmit signals through the connection between connectors 114 and 116. In other embodiments, expanded polymer member 112 may be connected to seat frame 110 or to other portions of vehicle seat assembly 20 in any manner effective for securing expanded polymer member 112. In some embodiments, the connection between connector 114 and 116 may serve to not only electrically connect expanded polymer member 112 to vehicle seat assembly 20 but may also serve to mechanically fasten expanded polymer member 112 to vehicle seat assembly 20.

Figure 10:
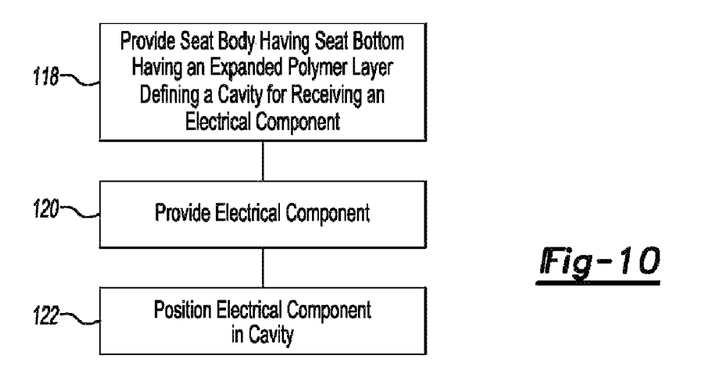
FIG. 10 is a block diagram illustrating a method for assembling a vehicle seat assembly in accordance with the teachings of the present invention.

With respect to FIG. 10, a block diagram is presented illustrating the method steps of assembling a vehicle seat assembly in accordance with the teachings of the present invention. At 118, a seat body is provided having a seat bottom having an expanded polymer layer that defines a cavity for receiving an electrical component. At 120, an electrical component is provided. At 122, the electrical component is positioned within the cavity of the expanded polymer layer. In variations of this method, a separate expanded polymer member may be provided in lieu of, or in addition to, the expanded polymer layer. In other variations, a separate step may be required for connecting connectors disposed on the vehicle seat assembly or elsewhere.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
a seat bottom adapted for attachment to a vehicle, the seat bottom having a foam layer;
a first expanded polymer layer disposed adjacent the foam layer, the first expanded polymer layer defining a first cavity configured to receive an electrical component; and
a wire assembly including a wire and an insulating material, the wire assembly being partially enveloped by the first expanded polymer layer such that a portion of the wire assembly is completely enveloped within the first expanded polymer layer and a portion of the wire assembly extends externally from the first expanded polymer layer.

2. The seat assembly of claim 1 wherein the electrical component is a motor assembly.

3. The seat assembly of claim 1 wherein the first cavity has a negative draft angle to retain the electrical component within the first cavity.

4. The seat assembly of claim 1 wherein the first expanded polymer layer comprises expanded polypropylene.

5. The seat assembly of claim 1 wherein a substantial portion of the electrical component is enveloped by the first expanded polymer layer and is bonded to an interior surface of the first cavity.

6. The seat assembly of claim 1 further comprising a second expanded polymer layer disposed adjacent the first expanded polymer layer, the second expanded polymer layer defining a second cavity that aligns with the first cavity to enclose the electrical component.

7. The seat assembly of claim 1 wherein the first expanded polymer layer is configured to receive the electrical component in a snap fit relationship.

8. The seat assembly of claim 1 wherein the first cavity comprises an elongate channel having opposing walls, the elongate channel being configured to receive and retain a first wire assembly between the opposing walls.

9. The seat assembly of claim 8 wherein a pair of spaced apart steps are defined by the opposing walls, the steps being spaced apart from one another by a distance that is less than a distance separating the opposing walls, the steps being configured to receive and retain a second wire assembly between the steps, the second wire assembly having a diameter that is narrower than a diameter of the first wire assembly.

10. The seat assembly of claim 8 wherein the first expanded polymer layer includes a first pair of tabs spaced apart from one another by a first distance, the first pair of tabs being disposed within the elongate channel, the first pair of tabs being configured to retain a second wire assembly having a second diameter within the elongate channel.

11. The seat assembly of claim 10 further comprising a second pair of tabs spaced apart from one another by a second distance, the second distance being less than the first distance, the second pair of tabs being disposed within the elongate channel, the second pair of tabs being configured to retain a third wire assembly within the elongate channel, the third wire assembly having a third diameter that is less than the second diameter.

12. The seat assembly of claim 1 further comprising a clip partially molded into the first expanded polymer layer.

13. The seat assembly of claim 1 wherein the portion of the wire assembly that is completely enveloped within the first expanded polymer layer has less insulating material than the portion of the wire assembly extending externally from the first expanded polymer layer.

14. The seat assembly of claim 1 wherein the first expanded polymer layer comprises a first portion of polyolefin having a first density and a second portion of polyolefin having a second density.

15. A vehicle seat component for use with a vehicle seat assembly, the vehicle seat component comprising:
a seat bottom adapted for attachment to a vehicle; and
an expanded polymer member connected to the seat bottom, the expanded polymer member defining a cavity for receiving an electrical component; and
a second expanded polymer layer disposed adjacent the expanded polymer layer, the second expanded polymer layer defining a second cavity that aligns with the first cavity to enclose the electrical component.

16. The seat assembly of claim 15 wherein the cavity has a negative draft angle.

17. The seat assembly of claim 15 further comprising a wire assembly that is at least partially enveloped by the expanded polymer member.

18. The vehicle seat component of claim 15 wherein the cavity is configured to retain the electrical component within the cavity through at least a partial interference fit.

19. The vehicle seat component of claim 15 wherein the expanded polymer member comprises expanded polypropylene.

20. A method of manufacturing a vehicle seat assembly comprising:
providing a seat body having a seat bottom that includes an expanded polymer layer defining a cavity for receiving an electrical component;
providing an electrical component; and
positioning the electrical component within the cavity.

* * * * *